(12) United States Patent
Kusumoto et al.

(10) Patent No.: US 7,797,168 B2
(45) Date of Patent: *Sep. 14, 2010

(54) SYSTEM AND METHOD FOR CONSUMER-SELECTED ADVERTISING AND BRANDING IN INTERACTIVE MEDIA

(75) Inventors: Laura Lee Kusumoto, San Francisco, CA (US); Earl David Sacerdoti, Alamo, CA (US); Leila Janine Sigler, San Francisco, CA (US); Sonya Lee Sigler, San Carlos, CA (US)

(73) Assignee: Avatizing LLC, San Francisco, CA (US)

( * ) Notice: Subject to any disclaimer, the term of this patent is extended or adjusted under 35 U.S.C. 154(b) by 1266 days.

This patent is subject to a terminal disclaimer.

(21) Appl. No.: 11/128,260

(22) Filed: May 13, 2005

(65) Prior Publication Data

US 2005/0216346 A1    Sep. 29, 2005

Related U.S. Application Data

(63) Continuation-in-part of application No. 09/675,958, filed on Sep. 29, 2000, now Pat. No. 6,954,728.

(60) Provisional application No. 60/204,179, filed on May 15, 2000.

(51) Int. Cl.
G06Q 99/00 (2006.01)
(52) U.S. Cl. .................................... 705/1.1
(58) Field of Classification Search ........ 705/1
See application file for complete search history.

(56) References Cited

U.S. PATENT DOCUMENTS 5,287,268 A    2/1994    McCarthy (Continued)

FOREIGN PATENT DOCUMENTS

JP    2001147881    5/2001

(Continued)

OTHER PUBLICATIONS

Elkin, Tobi, "What Is There?", <http://www.there.com> last visited Aug. 17, 2004 at 9:31 p.m., pp. 2 pgs.

(Continued)

*Primary Examiner*—Jonathan Ouellette
(74) *Attorney, Agent, or Firm*—Albrecht Tousi & Farnum PLLC; Ralph P. Albrecht; Cameron H. Tousi

(57) ABSTRACT

Participants in an interactive environment implemented by computer networks and other media such as interactive television are recruited to advertise products and brands to the other participants and viewers that are users of the media. Each participant may select from a set of available advertisements, which can be displayed in association with the user's avatar, virtual space and virtual objects within or embodying the virtual world. Participants are given incentives to do this by the availability of rewards, such as coupons, real or virtual money or other resources, which are provided by the advertising sponsors, based on adoption of the advertising by the participant, as well as on factors such as exposure of the selected advertisements to other users. Allowing the users to exercise advertising choice, as participant or viewer, the invention also facilitates collection of data regarding consumer preferences.

31 Claims, 12 Drawing Sheets

U.S. PATENT DOCUMENTS

| | | | |
|---|---|---|---|
| 5,297,249 | A | 3/1994 | Bernstein et al. |
| 5,347,632 | A | 9/1994 | Filepp et al. |
| 5,395,243 | A | 3/1995 | Lubin et al. |
| 5,481,666 | A | 1/1996 | Nguyen et al. |
| 5,572,643 | A | 11/1996 | Judson |
| 5,625,781 | A | 4/1997 | Cline et al. |
| 5,682,511 | A | 10/1997 | Sposato et al. |
| 5,959,623 | A | 9/1999 | Van Hoff et al. |
| 6,023,270 | A | 2/2000 | Brush |
| 6,036,601 | A | 3/2000 | Heckel |
| 6,804,659 | B1 | 10/2004 | Graham et al. |
| 6,842,767 | B1 | 1/2005 | Partovi et al. |
| 6,847,969 | B1 | 1/2005 | Mathai et al. |
| 6,981,220 | B2 | 12/2005 | Matsuda |
| 2001/0034661 | A1 | 10/2001 | Ferreira |

FOREIGN PATENT DOCUMENTS

| | | |
|---|---|---|
| JP | 2001147881 A | 5/2001 |
| WO | WO 01/88803 A2 | 11/2001 |

OTHER PUBLICATIONS

"Adaboy," <http://www.adaboy.com ><NY-Pittsburg-LA, 622 Second Avenue Pittsburg, PA 15219> 2 pgs.,Undated advertising brochure based on U.S. Patent No. 6,036,601.

Avaterra.com Premiers At Web Marketing Conference; Demonstrates New Interface for Web Advertisements:, Business Wire, Jun. 17, 1999.

Interactive Gaming and Communications Corp. (IGC) Provides Co-Branded Play for Fun Casino Games-Sitetos Lycos:, PR Newswire, 1841, Nov. 23, 1999.

"World.Com Reports Initial Advertising, E-Commerce Results from Freeserve, UK's Leading ISP" PR Newswire, Apr. 7, 2000.

Riedman, Pat, "Avatars build character on 3-D chat sites, "Advertising Age, p. 40, Sep. 9, 1996.

Fujitsu 2: WorldsAway Avatar Communities by Fujitsu Expand Onto the Internet, Fujitsu Launches Web Services after Explosive Growth on CompuServe, Business Wire, Oct. 23, 1997.

CommerceCity Virtual World Changing the Face of Online Shopping; New Web Site Combines e-Commerce with Virtuality, PR Newswire, Jan. 21, 1999.

IDGA "2004 Persistent Worlds Whitepaper" 2004 pp. 1-82.

Tessa Wegert, "Gaming 101" Sep. 22, 2005, pp. 1-2.

Betsy Book, "These bodies are FREE, so get one NOW!": Advertising & Branding in Social Virtual Worlds' Apr. 2004, pp. 1-30.

Kevin J. Delaney and Robert A. Guth "Beep. Foosh. Buy Me. Pow. Nielsen's Plans a New Service to Assess Audiences for Ads in Hit Videogame Medium" Wall Street Journal, Apr. 8, 2004.

Nancy Coltun Webster "Now down to business: Counting gamer thumbs; Billion-dollar question: How to measure with TV, print models' accuracy?(Special Report Interactive: Games)" Advertising Age, May 24, 2004.

Erin White "Advertisers, Teens Hang Out Online At the Habbo Hotel" Wall Street Journal, May 7, 2004.

| CUSTOMER ID | LAST NAME | FIRST NAME | E-MAIL ADDRESS | ENCRYPTED PASSWORD | LIST OF CURRENT AVATAR IDS | SAVED STATE | EXTERNAL INFO. | EXPERIENCE DATA | AGGREGATE DATA | CONSUMER PROFILE |
|---|---|---|---|---|---|---|---|---|---|---|

DATABASE LAYOUT - CONSUMER DATABASE

FIG. 4A

| ADVERTISE-MENT ID | AVATAR ID | ELAPSED TIME THIS AVATAR | ENVIRON-MENT | # OF OTHER EXPOSED AVATARS | # OF NON-PARTICIPATING VIEWERS | TOTAL EXPOSURE TIME | |
|---|---|---|---|---|---|---|---|
| | | | | | | | |

DATABASE LAYOUT - PRESENTATION TRACKING DATABASE

FIG. 4C

SYSTEM AND METHOD FOR CONSUMER-SELECTED ADVERTISING AND BRANDING IN INTERACTIVE MEDIA

CROSS REFERENCE TO RELATED APPLICATIONS

This application claims the benefit of U.S. patent application Ser. No. 09/675,958, filed on Sep. 29, 2000, which claims the benefit of U.S. Provisional Application No. 60/204,179, filed on May 15, 2000, the contents of both are incorporated herein by reference in their entireties.

BACKGROUND OF THE INVENTION

In conventional advertising formats, the consumer is a recipient and relatively passive vis-à-vis the advertising. The advertising is in effect pushed or thrust upon a non-voluntary and often indifferent consumer, who may become jaded to the experience and make an effort to ignore the advertising, or consider it part of the background. Even when the advertising is applied to the participant's own avatar in an interactive game (a race car, for example), the participant has no say in what advertising is applied, and no real interest in the issue.

In an increasingly interactive world, advertisers and media outlets are using new venues to sell to and entertain consumers. These venues make use of a wide range of diverse devices. Simultaneously, the increased diversity has empowered consumers by forcing advertisers and media outlets to find new ways to distribute their messages. The interactive nature of the venues provides the basis upon which to build a solution by bringing consumers in as active participants.

SUMMARY OF THE INVENTION

The present invention provides a way for sponsors to promote their brands or otherwise advertise products and services in virtual and real environments such as computer networks and other interactive media such as interactive television and dynamically-modifiable displays, audio messages, streaming video, or other multimedia modalities. The invention provides users with the ability to choose sponsors' logos, names, commercial symbols or advertisements to appear on their avatars, such as in a virtual spaces or on virtual objects that represent them within the virtual environments. According to embodiments of the invention, the virtual environment includes dynamically modifiable presentations, audio streams, interactive television, etc., as well as dynamically modifiable information sources. The invention provides a mechanism for audience members (consumers) to choose the logo, names, commercial symbols, or virtual objects associated with an advertiser, or advertisements that are presented on their avatars, game pieces, game elements such as cards in an online card game, or within information sources whose content the consumers can control or influence. Similarly, the invention provides consumers with the ability to choose the advertisements presented to them within audio, streaming video, or other multimedia modalities. The invention also provides methods for deriving revenue or other rewards from those choices, and provides mechanisms for tracking the usage of those logos, names, commercial symbols, or advertisements according to embodiments of those methods.

The invention seeks to involve participants more directly in the matter of advertising, to provide incentives for them to adopt and deploy advertising, and to provide a source of revenues based thereon. It resolves or mitigates the conflict between the goals of the user and the advertiser by providing a method of advertising that makes participants in the virtual world willing agents of the advertiser and advertising part of their activities.

According to the embodiments of the invention, the method for selected advertising using a virtual world operates by providing an advertisement group to a participant, wherein the advertisement group consists of at least one of an advertisement, one or more advertisements of one or more categories, or one or more advertisements of one or more advertisement profiles; receiving a selection of the advertisement group from the participant; when a plurality of locations exists, providing the plurality of locations for the participant to choose to present the advertisement group using the virtual world and receiving a selection of one or more locations from the plurality of locations from the participant; when only one location exists, selecting the location; creating a selected advertisement group from the selection of the advertisement group and either of i) the selection of the one or more locations or ii) the one location; storing the selected advertisement group, the selection of one or more locations; providing for presentation to a user of the selected advertisement group using the virtual world, wherein the users have access to the virtual world; and providing a reward to at least the participant, wherein the reward is based on at least the creating of a selected advertisement group.

BRIEF DESCRIPTION OF THE DRAWINGS

The accompanying drawings, which are incorporated herein and form part of the specification, illustrate embodiments of the present invention and, together with the description, further serve to explain the principles of embodiments of the invention.

FIGS. 4A, 4B and 4C show the database fields for users, advertisers and transactions, respectively, as used in an embodiment of the invention.

Figure 1:
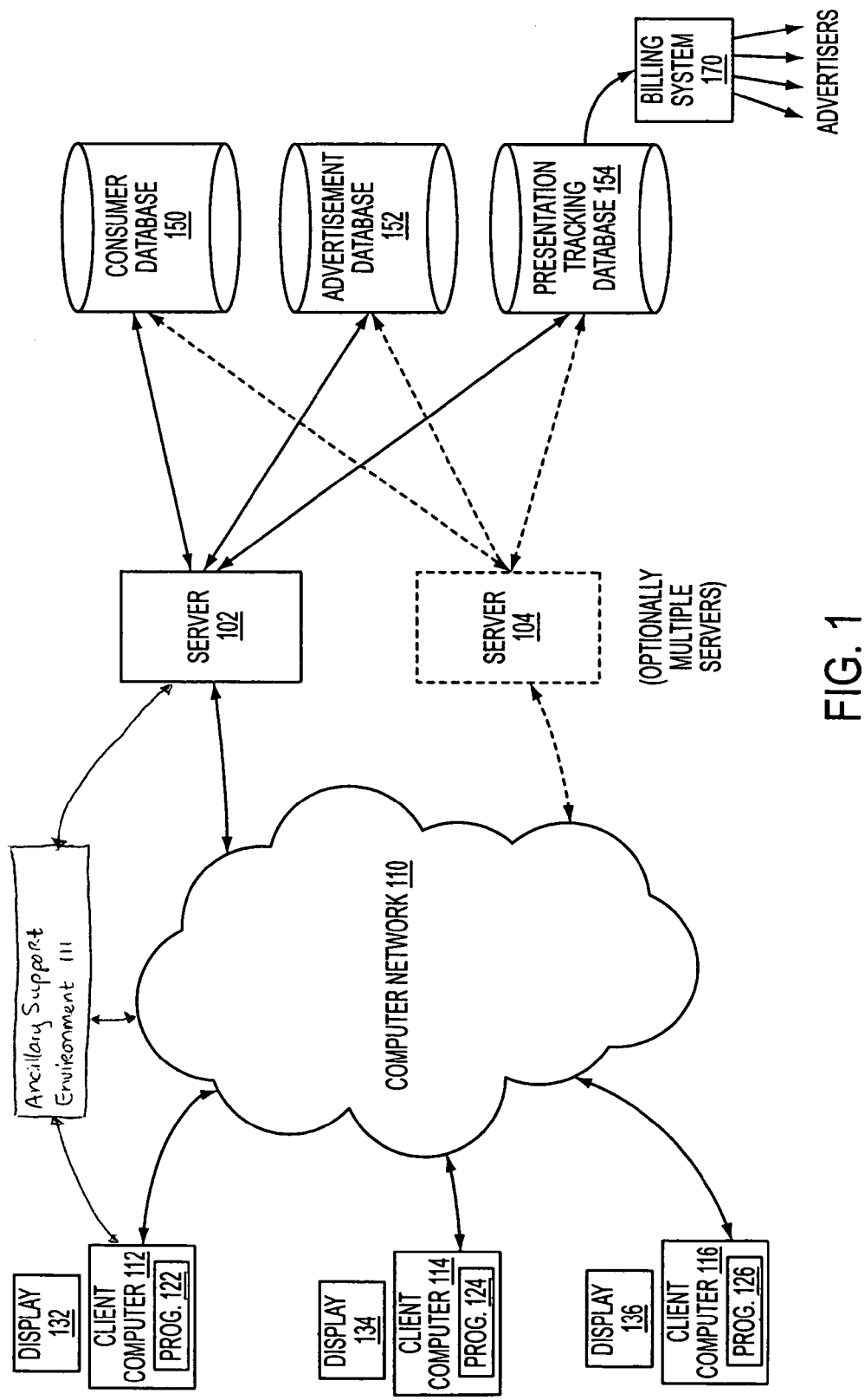
FIG. 1 shows a diagram of the network components, data repositories and their respective interconnections used in one embodiment of the invention.

It should be understood that these figures depict embodiments of the invention. Variations of these embodiments will be apparent to persons skilled in the relevant art(s) based on the teachings contained herein. For example, the flow charts contained in these figures depict particular operational flows. However, the functions and steps contained in these flow charts can be performed in other sequences, as will be apparent to persons skilled in the relevant art(s) based on the teachings contained herein.

DETAILED DESCRIPTION OF THE INVENTION

Many forms of online interactive entertainment immerse participants in a virtual world, which may closely reflect the real world in some respects, but which in other respects dramatically and selectively amplifies real world experience. To personalize the user's experience, the concept of "self" must be carried into the virtual environment as well. It is common in such forms of entertainment for each participant to be provided with an "avatar" that represents how the participant's "self" is manifested in the virtual world.

The concept of an "avatar" is used extensively in this application. To better understand how the term "avatar" is used herein, it is helpful to consider how one interacts with the virtual world or how users in the real world view the virtual world, as is described in further detail herein.

As used herein, an "avatar" may be understood to include a graphical object in 2D or 3D, often representing a persona of a consumer, but not limited to such a representation, appearing within a virtual environment. As the term is used in connection with embodiments of the invention (discussed in detail below), an avatar may act under the direct control of the consumer. However, it could be pre-programmed by the consumer to perform certain behaviors, or it could simply perform behaviors that are hardwired by the system. According to embodiments of the invention, an avatar can take on the visual appearance of any living creature in humanoid, animal, plant, mythical, or other form, or it can be an animated depiction of a non-living thing such as a robot, vehicle, weapon, computer, constellation of stars, etc. In alterative embodiments, the virtual world can be a modifiable display such as an electronic bumper sticker, a tee shirt with a flexible LCD panel, or a billboard whose display is controlled by a computer or other processor, and the avatar can be fashioned to look like an inanimate object or fill a portion of, some part of, or fill the entire display to render one or more advertisements.

According to embodiments of the invention, a virtual world or virtual environment can be implemented using computer networks (known as "networked virtual environment") and other interactive media such as interactive television and the projection of interactive content to an audience. The interactivity provided by interactive media, such as interactive television, is narrower than the interactivity provided by the embodiments of the invention. They are not one and the same thing, and the method provides for additional kinds of interactivity among users, advertisers, etc., as are described in detail herein. Thus, one of ordinary skill in the relevant arts would understand that the embodiments of the invention provide interactivity while utilizing a greater range of devices as opposed to just television.

As one of ordinary skill would appreciate based at least on the teachings provided herein, the interactivity of the invention provides for the selection and/or presentation of advertisements in various forms through interactive environments. As such, according to embodiments of the invention, the interactive nature of embodiments of the invention provides a system that is changeable by a user and responsive to changes by the user, advertisers, or in the virtual world. Also, mobile telephones or other communicating mobile devices such as personal digital assistants, tablet PCs, programmable displays on clothing, automobiles, or other personal or real property, or "real-world" virtual environments such as interactive themed environments are also included as interactive media. It is important to note, however, that none of the embodiments of the invention require the actual display to be interactive. A "networked virtual environment" implements a virtual world, a 2D or 3D representation or simulation of a physical space. The networked virtual environment is accessible over a computer network or digital media network by multiple participants, who may interact with the virtual world and with one another in near-real time. Similarly, an "interactive television" is conventional television content augmented with interactive facilities, usually delivered over a digital channel augmented by a back channel to the content broadcaster and by a terminal or other control device. Users and viewers can interact with the content via the control device.

Traditionally, avatars are thought of as representations of people, which are distinct from the rest of a virtual world. This delineation is not required, however, by the embodiments of the invention, which goes beyond the classical utilization of avatars. Examples of this are clear from the embodiments described herein, such as, but not limited to the application to wearable displays, which may be on tee-shirts, which allow for the avatar to be the display portion of the tee-shirt, and the virtual world to be presented through it to other users. In an early, traditional sense, the avatar usually takes the form, for example, of "first-person" games, where the view of the virtual world is through the eyes of the avatar, as the central acting figure, or a third-person perspective (from the point of view of a third-party avatar or camera watching them). According to these embodiments, participants interacting with the virtual environment can view advertisements, or alternatively, the advertisements may be presented to non-participants who are not represented by an avatar in the environment or who may be outside in the real world looking at a display of the virtual world.

The concept of "advertising" is also used throughout this application. For purposes hereof, the term "advertising" is used in a broad sense, and is intended to cover traditional advertisements, as well as the use of "brand marks," which can take the form of a corporate symbol or logo, a trademark, advertising text or copy, a graphical picture, a banner ad on a web page, or any visual or auditory multimedia or streaming media element employed for the purposes either of advertising per se, or simply promoting or exposing a product, brand, trademark or service mark. Even when used alone without specific reference to branding and brand marks, the term "advertising" should be understood to refer to the use of such images and indicia as well as to traditional advertising.

According to embodiments of the invention, the method may operate to accomplish, but it is not limited to, the following:

Encouraging positive rather than negative consumer attitudes about advertising by giving the consumers a positive role in the selection of advertising;

Further encouraging consumer adoption and deployment of advertising by providing financial incentives for users to adopt and deploy advertising indicia;

Developing advertising pricing models based on such methods of ad deployment;

Developing server pricing models for the consumer based on application of offsetting ad revenues;

Providing a mechanism for the consumer to display advertising for his/her own products, services, or interests;

Developing on-line events based on common chosen sponsorship;

Providing a means for consumers to become creative contributors to commercial advertising media;

Providing a means for user-selected advertising to be placed on web pages for viewing by the user or by others; and Providing a means for user-selected advertising to become integrated with real world clothing, dress, stickers, billboards, posters, vending machines, "programmable paper," media projected onto a real-world space, or any other programmable or dynamically modifiable display.

In further embodiments of the invention, the method may collect data on consumer preferences without encountering the resistance to disclosing product and brand preferences commonly expressed by consumers in surveys and the like. Advertisers may be billed on a number of bases, including ad exposure.

Recruiting participants who may then use virtual worlds to advertise to the users, i.e., other participants and viewers, of that virtual world, accomplishes at least the above described features of the invention. Each user entering or viewing a virtual world may select from at least a set of available advertisements, which can be displayed in the virtual world. Users are provided with incentives to do this by the availability of rewards, such as coupons or real or virtual money or other resources, which are provided by the advertising sponsors, based on adoption of the advertising by the user, as well as on factors such as exposure of the selected advertisements to other users in the virtual world.

By allowing the consumer to exercise advertising choice, this embodiment also facilitates collection of data regarding consumer preferences.

The embodiment of the consumer-choice-avatar advertising-method is illustrated in FIGS. 1-5, and described in the text that follows. Although the following focuses on particular embodiments of the invention, the claims appended to this application should not be interpreted as limited by the particular details disclosed in connection with those embodiments.

Referring to FIG. 1A the networked virtual environment of one embodiment of the invention is generated on one or more servers 102, 104, etc. distributed over a computer network 110; received by participating consumers' computers 112, 114, 116, etc. by client computer programs 122, 124, 126, etc. (which are of an animated graphical nature); and displayed on consumers' computer displays 132, 134, 136, etc. by those programs. The networked virtual environment is accessible over the computer network by multiple participants simultaneously.

The environment projected can be the setting for a networked (online) game or other online entertainment activity such as a virtual dance, virtual sporting event, life or fantasy simulation, networked gambling, etc. It can also be an online commerce setting such as a virtual store, virtual shopping mall, virtual town square, or virtual trade show; or it can be an online communications setting such as chat, instant messaging, virtual meetings, virtual rallies, virtual conferences, etc. The host may also allow consumers to merely watch the virtual world on other devices, as described elsewhere herein, such as, for example, billboards, store-front signs, banners, and other public displays, as one of ordinary skill in the art would appreciate based at least on the teachings provided herein.

Alternative embodiments of FIG. 1 include the application of automated teller machines (ATM), telephones, smart cards, and other devices, as one of ordinary skill in the relevant art(s) would appreciate based at least on the teachings provided herein, as client computers 112, 114, and 116. In addition, various embodiments of the invention make use of an ancillary support environment 111 within at least program 122, as shown in FIG. 1. In alternative embodiments of the invention, the ancillary support environment 111 may, as is indicated in FIG. 1, be implemented on another or more than one platform. In such embodiments, the ancillary support environment may operate on more than one client or type of device.

According to an embodiment of the invention, the ancillary support environment 111 may provide an interface for the client computer 112 via the computer network 110 to the server 102. The networked virtual environment may be supported by an ancillary support environment (such as ancillary support environment 111 described in greater detail herein) that may have access to one or more distinct networks, such as, but not limited to, computer network 110, in various forms, but is distinct, separate or outside of the virtual world, for example, menus, dialog boxes and control panels provided by client programs such as client program 122, or separately enabled, but interconnected via the computer network 110, or implemented on the server 102. In optional embodiments of the invention, the ancillary support environment may be implemented on more than one of these systems. While FIG. 1 describes components of the networked virtual environment to project a setting for a networked game or other online entertainment activity, a virtual world can be implemented in other interactive media such as interactive television. In addition, the ancillary support environment may be implemented using traditional communications media such as telephone, email, a form on a web site, or paper and physical mail, and communicated to the servers using conventional means such as optical character recognition or manual data conversion. Further, the preferences specified in the ancillary support environment may be stored in digital media that are off-line from the network, for example, on a "smart card," and acquired by the networked environment at the time the user accesses the network.

Figure 2A:
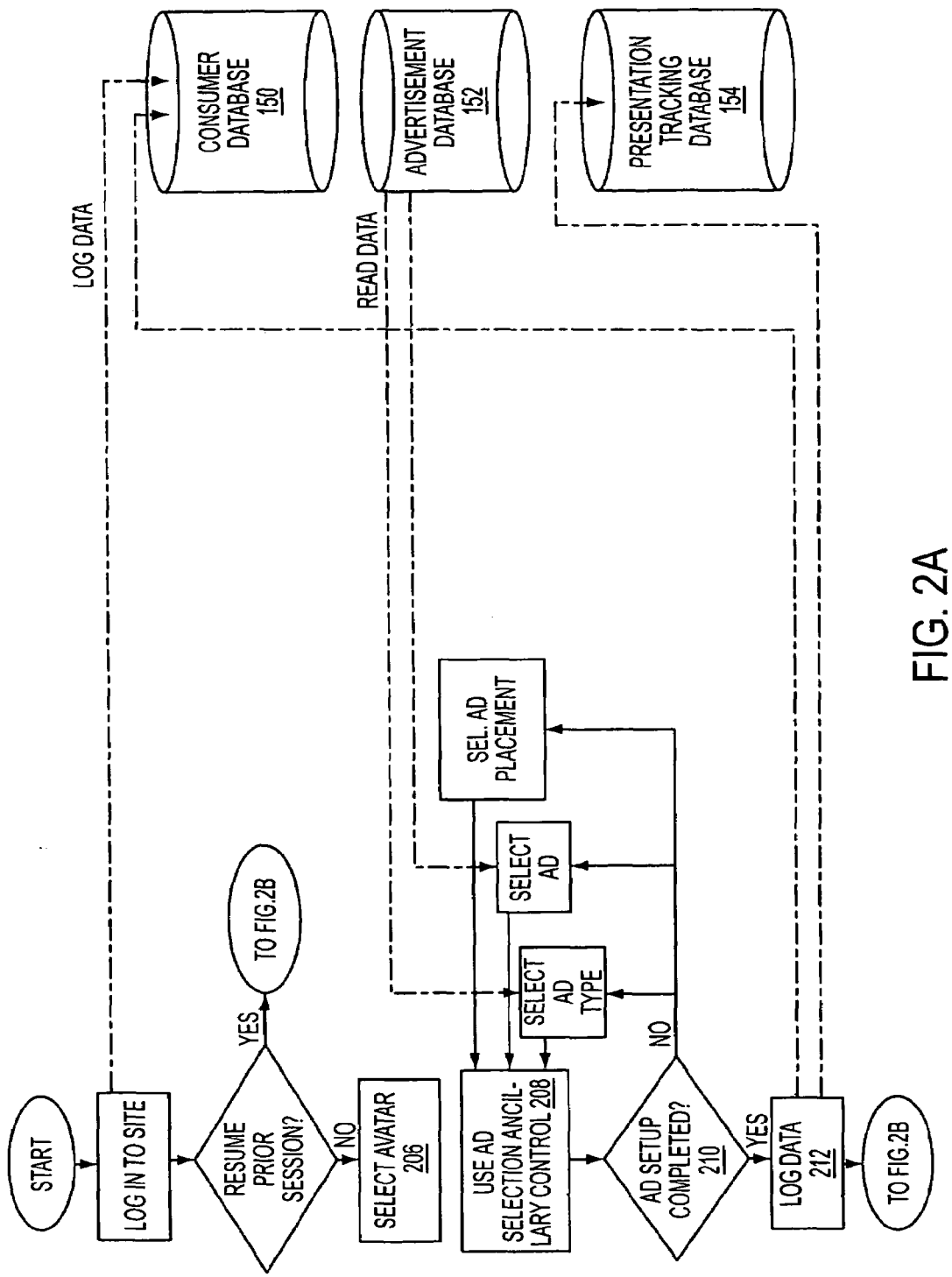
FIGS. 2A-2D show flowcharts illustrating the various operations of the method, according to embodiments of the invention.
Figure 2B:
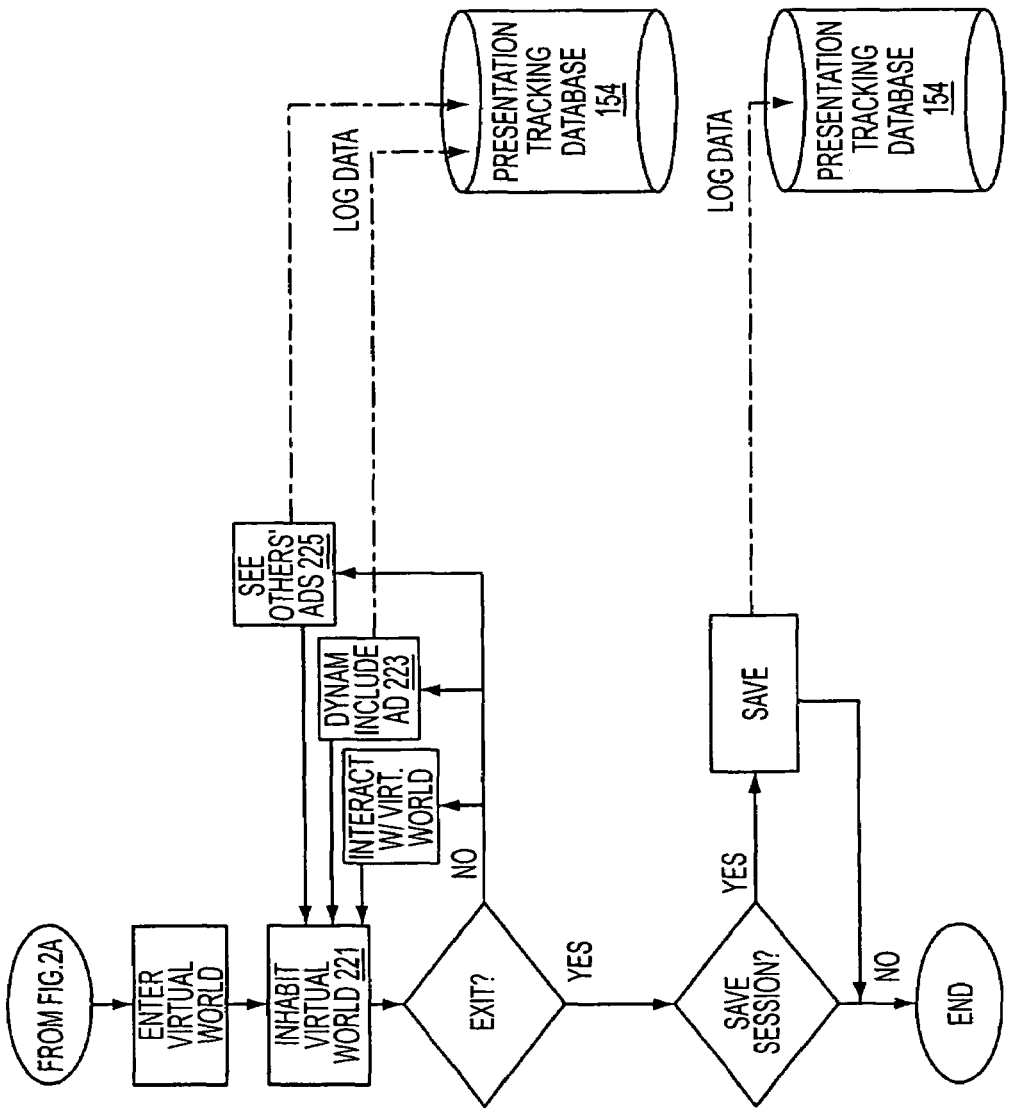

When participating in the virtual world, consumers are exposed to the images and sounds of their own and other consumers' avatars interacting with one another in the virtual environment. A flow chart depicting a simple course of interaction between a user and this embodiment of the invention is shown in FIGS. 2A and 2B. The user selects a presentation location (206), which may be on an avatar or some other location, as described elsewhere herein which the participant has the ability to select as a location for the advertisement. The advertisement or advertisements will then appear on the object. This may be permitted within the ancillary support environment, within the virtual environment, or both. When creating or modifying their avatars, users may be presented with multiple choices for the advertisements that will be displayed on the avatars. The user selects (208) one or more advertisements to appear in pre-designated parts of the avatars, or they place the advertisements on the avatars.

Figure 3:
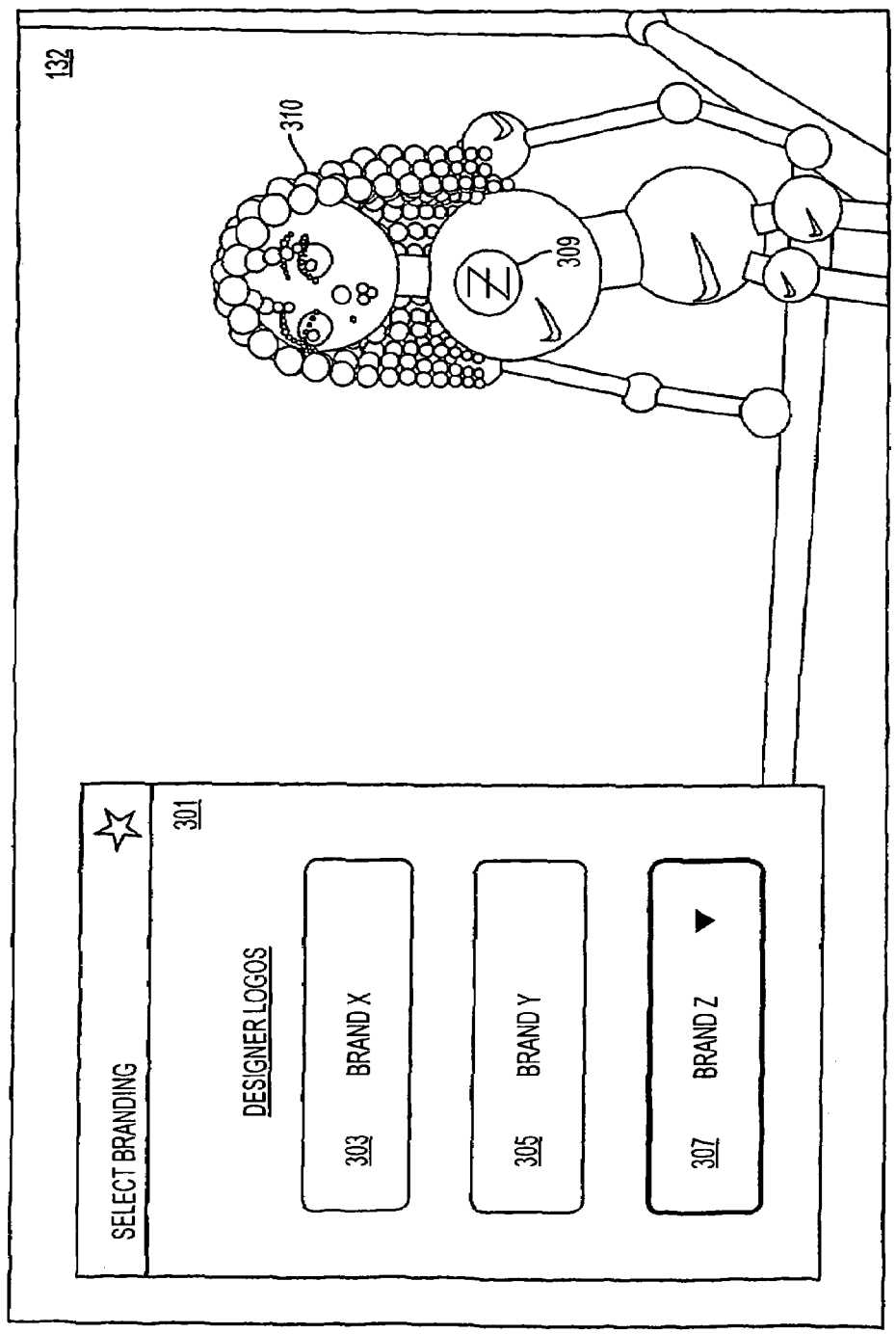
FIG. 3 shows a sample branding selection screen as used in one embodiment of the invention.

For example, as shown in FIG. 3, the user is provided an ancillary dialog box 301 with "Designer Logo" selections 303, 305, 307 (read from advertisement database 152 in FIG. 2A) that may be selected with a mouse and dragged onto an appropriate location (309) on the clothing of avatar 310. Alternately, the user could find appropriate branded materials in the virtual world, and apply them by taking actions solely in that world. Preferably, the advertisement will be associated with a display mode constraint to require it to be displayed in the specified manner and orientation, and preferably further in a manner that makes its association with the avatar of the consumer who selected the advertisement obvious to most participants.

The advertising selection ancillary control (such as dialog box 301) may also specify how the advertisement will be displayed if selected, the amount of control the consumer may exercise over the time and manner of the display, what rewards will be given to the consumer for displaying each advertisement, and the variables upon which the nature and size of the reward depend. Alternatively, the various embodiments of the invention described herein may be determined by software operating on either or both of the server(s) 102, 104. For example, in embodiments of the invention, the software may specify how the advertisement will be displayed if selected, the amount of control the consumer may exercise over the time and manner of the display, what rewards will be given to the consumer for displaying each advertisement, and the variables upon which the nature and size of the reward depend.

The user performs the selection and placement process by using the client computer programs (122, etc. in FIG. 1). When the user indicates s/he is satisfied with the selection (210 in FIG. 2A), the relevant information is transmitted to the server(s) 102, 104 and stored in consumer database 150 and presentation tracking database 154. Then, whenever the servers cause the avatar representing that user to appear in the networked virtual environment (221), the relevant advertisements are dynamically included (223) in the presentation of the avatar within the networked virtual environment. Other users whose avatars are nearby in the virtual world thus "see" this advertisement. The user also sees (225) ads placed by other users on or in connection with their avatars. Server(s) 102, 104 cause the exposure of advertisements in this manner to be logged in databases 150, 154.

One of ordinary skill in the art, based at least on the teachings provided herein, will be able to understand that, according to the embodiments of the invention, the information concerning the user's choices in the selection and placement process may alternatively be stored in offline media such as a "smart card" or in the memory of mobile devices such as cell phones. According to embodiments of the invention, interactive display devices such as digital billboards, or the electronic display of vending machines may be used to present the advertisements to users. Information concerning this presentation can then be transmitted by the device, or stored in the offline medium for later transmission to server(s) 102, 104.

Figure 2C:
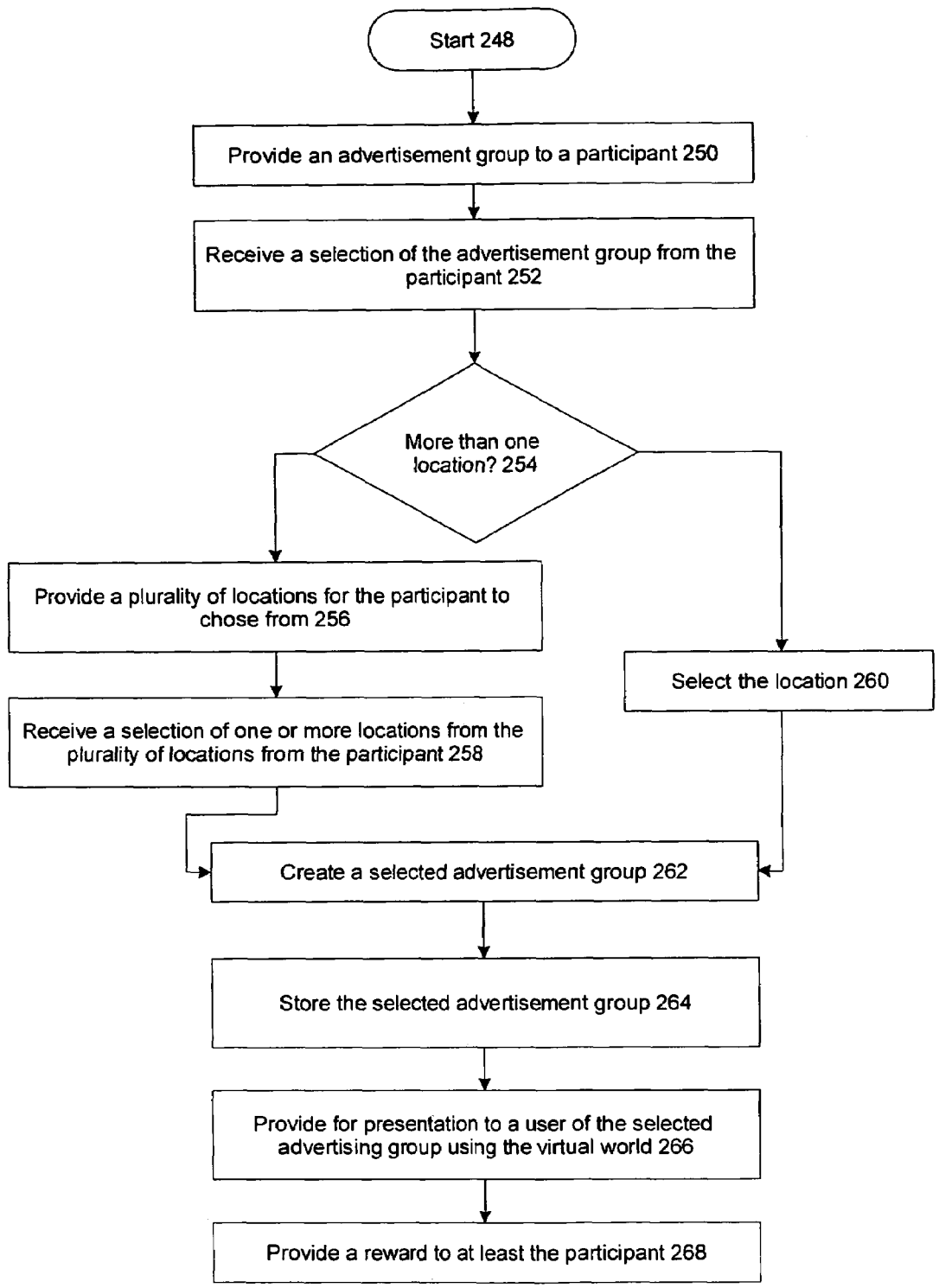

In FIG. 2C, a flowchart illustrating a method of the invention, according to embodiments, is shown. The method may be performed, as is described herein, by computers or other machines with access to machine readable storage medium. The method begins operation at 248 and proceeds immediately to operation 250, where it provides an advertisement group to a participant. According to embodiments of the invention, the advertisement group itself consists of at least one of an advertisement, one or more advertisements of one or more categories, or one or more advertisements of one or more advertisement profiles. The method proceeds immediately to operation 252.

At operation 252, the method receives a selection of the advertisement group from the participant, and proceeds to operation 254. At operation 254, the method determines whether there is more than one location upon which the advertisement group can be placed. When a plurality of locations exists, the method proceeds to operation 256 and provides the plurality of locations for the participant to choose from, in order to present the advertisement group using the virtual world. The method then, at operation 258, receives a selection of one or more locations from the plurality of locations from the participant. When only one location exists, the method, at operation 260, selects the location.

At this point, from either of operations 258 or 260, the method proceeds to operation 262, and creates a selected advertisement group from the selection of the advertisement group and, when there is more than one location, the selection of the one or more locations.

The method of the invention, according to embodiments, proceeds at operation 264 to store the selected advertisement group. In embodiments of the invention, the method stores one or more of these items in one or more of the various databases described above with respect to FIGS. 1, 2A or 2B. The method then proceeds to operation 266.

At operation 266, the method provides for presentation to a user of the selected advertisement group using the virtual world, wherein the users have access to the virtual world; and, then, at operation 268, the method then provides a reward to at least the participant. According to embodiments of the invention, the reward is based on at least the creating of the selected advertisement group. In alternative embodiment, the reward may be based on other criteria, as described elsewhere herein, and as one of ordinary skill in the art would appreciate based at least on the teachings provided herein.

In embodiments of the invention, the advertisement group and the plurality of locations is provided using at least one of i) the virtual world or ii) an ancillary support environment. In additional embodiments of the invention, the ancillary support environment includes one or more interfaces for exchanging information and choices.

Figure 2D:
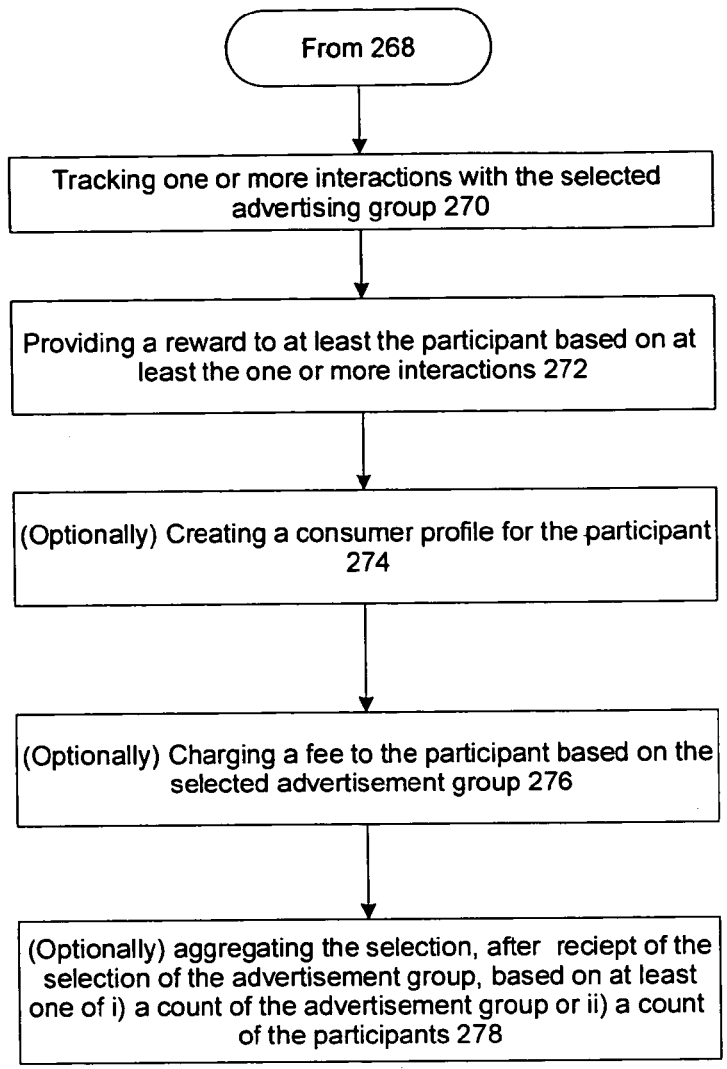

In FIG. 2D, the method of the invention may, according to embodiments, perform the additional operations of: (operation 270) tracking one or more interactions with the selected advertisement group by the user; and (operation 272) providing a reward to at least the participant, wherein the reward is based on at least the one or more interactions.

According to embodiments of the invention, the reward may include at least one of coupons, merchandise, credits, goods, services, information about the virtual world, information about real world events, opportunities in the virtual world, real money, or virtual money.

In an optional embodiment of the invention, the method may perform the operation of creating a consumer profile for said participant, wherein said consumer profile includes at least one of (a) registration information, (b) environment continuation information to allow the participant to continue where the participant previously left in the virtual world, (c) information on one or more the selected advertisement groups of the participant, (d) information on the selection of said advertisement group, or (e) information on the at least one selection of the one or more locations, or (f) reward information. This operation is illustrated in FIG. 2D, as operation 274. In further embodiments of the invention, the category includes type of product, brand, vendor, company, a specific product, products relevant to a specific activity or interest, or advertisements of a specific advertiser.

In another embodiment of the invention, the advertisement profile includes a plurality of the advertisements selected from one or more categories. In yet another embodiment of the invention, the advertisement profile is provided by the participant.

As one of ordinary skill in the relevant art would recognize, the virtual world, also called the virtual environment, may include, based on the expanded teachings of interactivity provided herein, media displayed on mobile devices, streaming video, streaming audio, radio, television, voice portal, web site, web meeting or information presentation environment. According to other embodiments of the invention, the storing operation of the method uses a computer, an off-line storage medium, or a portable device, as is described elsewhere herein with respect to at least FIG. 1.

According to alternative embodiments of the invention, the ancillary support environment 111 may include electronic mail, web browser, online agent, instant messaging, paging, text messaging, or short message service.

As described elsewhere herein, according to embodiments of the invention, the advertisement may include a logo, name, commercial symbol, virtual object associated with an advertiser, audio, video, or banner.

As one of ordinary skill in the art would appreciate based at least on the teachings provided herein, the location includes, but is not limited to, a wearable display, a game piece, a game card, a game element, a display controlled or influenced by the participant, a web page, a time slot in an audio or video stream, radio or television broadcast, on-hold audio message, real world clothing, dress, sticker, billboard, poster, vending machine, programmable paper, or media projected onto a real-world space.

As one of ordinary skill in the art would appreciate based at least on the teachings provided herein, the reward may include contest clues, licensing fees or royalty fees.

In one embodiment of the invention, the one or more interactions may include increasing the reward when aspects of the virtual world are shared using the advertisement group, tracking click events and click-through events, or transferring aspects of the virtual world to another medium. For example, rewards to a participant may be increased if his or her advertisements are clicked on by a user, resulting in bringing up a web page from which a purchase may be effected.

In many of the embodiments described herein the method may operate to pay the reward(s) to an advertiser. In alternative embodiments of the invention, the reward to the advertiser may be different from the award to the consumer. In further embodiments, there may not be an immediate reward to anyone.

In an alternative embodiment of the invention, the method includes the operation of charging a fee to the participant based on the selected advertisement group. This operation is illustrated in FIG. 2D as operation 276. In embodiments of the invention, the method may charge a fee to a participant for access to particular advertising materials, such as those including various celebrities, new products, various musical soundtracks or scores, etc.

In an alternative embodiment of the invention, the method optionally aggregates the selection, after the receiving the selection of the advertisement group, based on at least one of i) a count of the advertisement group or ii) a count of the participants, as is illustrated in FIG. 2D as operation 278. In further embodiments of the invention, the method may aggregate other elements generated or tracked before, during or after each or any of the operations described herein. In one embodiment of the invention, the aggregation operation may be performed at a public event, such as, but not limited to, a theatre, where participants in the audience make individual selections of one or more advertisement groups that are aggregated to determine a selection of the overall audience.

In another embodiment of the invention, the method provides for the presentation of the selected advertisement group, which may occur at user-selected places and times or at places and times determined by at least sensors that provide information indicating the user's actions or the user's location. For example, a cellular telephone equipped with short-range wireless technology may provide persistent information about the selected advertisement group, and places and times for its presentation on a publicly-viewable display when the user carries the phone within the wireless communication range of the display.

Figure 5:
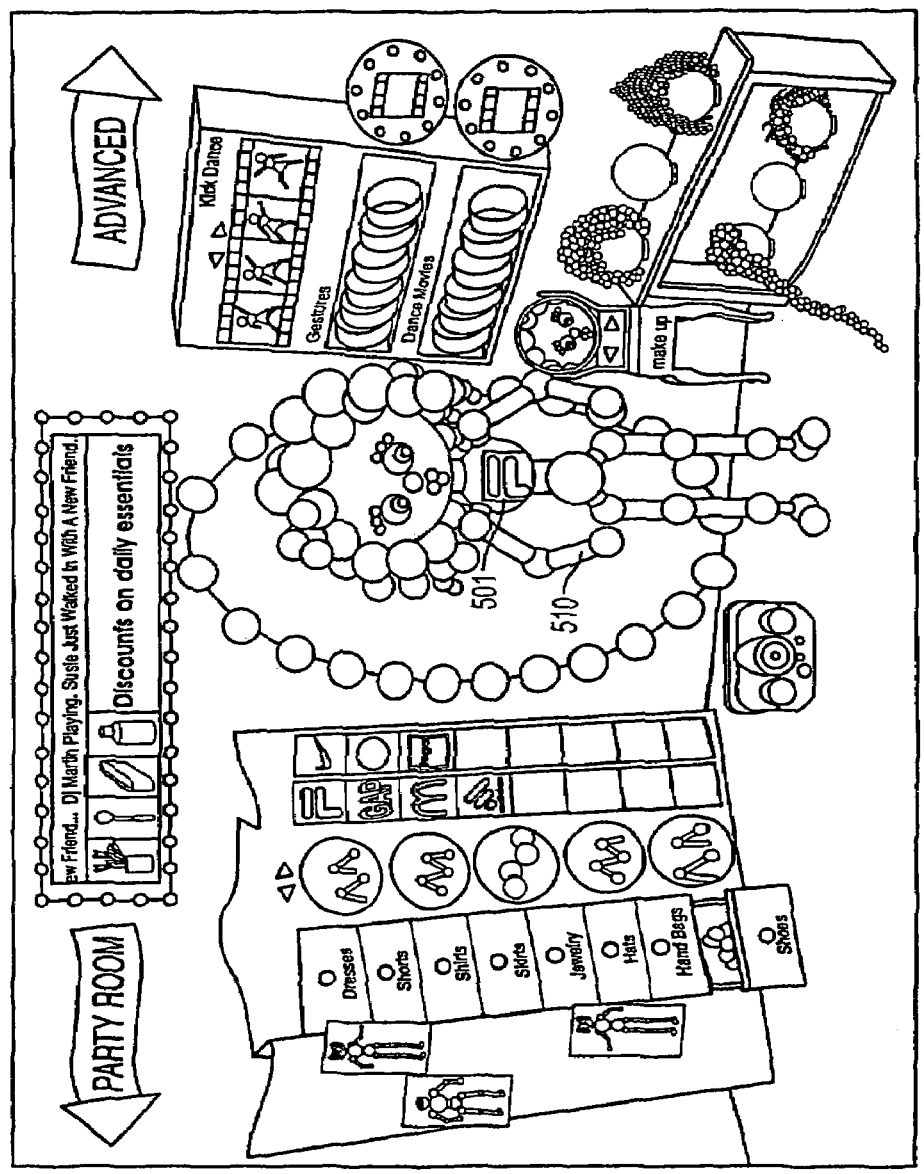
FIG. 5 shows a scene from a virtual world in accordance with one embodiment of the invention, in which a participant's avatar is wearing an item of clothing with a participant-selected designer logo.

If the advertisement(s) are purely graphical in nature, they are presented on the 2D avatar image or 3D avatar form using means known to those of ordinary skill in the art. If they contain audio or animation or other multimedia elements, these elements are played as part of the avatars' behavior at times designated by the user or determined by the system. FIG. 5 shows a screen from an embodiment of the invention in which branding 501 is displayed on avatar 510, which is engaged in animated activity within the virtual world (hosting a party).

The time and manner of the presentation of the selected advertisement can be determined entirely by the consumer, or be at least partially controlled by server(s) 102, 104. For example, a corporate logo could be available for presentation on a cap worn by an avatar, an audio sequence could be available to play each time an avatar performs a specified action, such as waving, and a musical routine could be available for an avatar to perform whenever the consumer controlling the avatar chooses. The advertisement may be created by any party commissioned to do so by the advertiser, including the consumers themselves. Consumers might be encouraged to submit ideas to the host or the advertiser regarding advertisements that could be made available for presentation in the virtual world. Consumers might also themselves be advertisers, and submit and place their own advertising.

Figure 6:
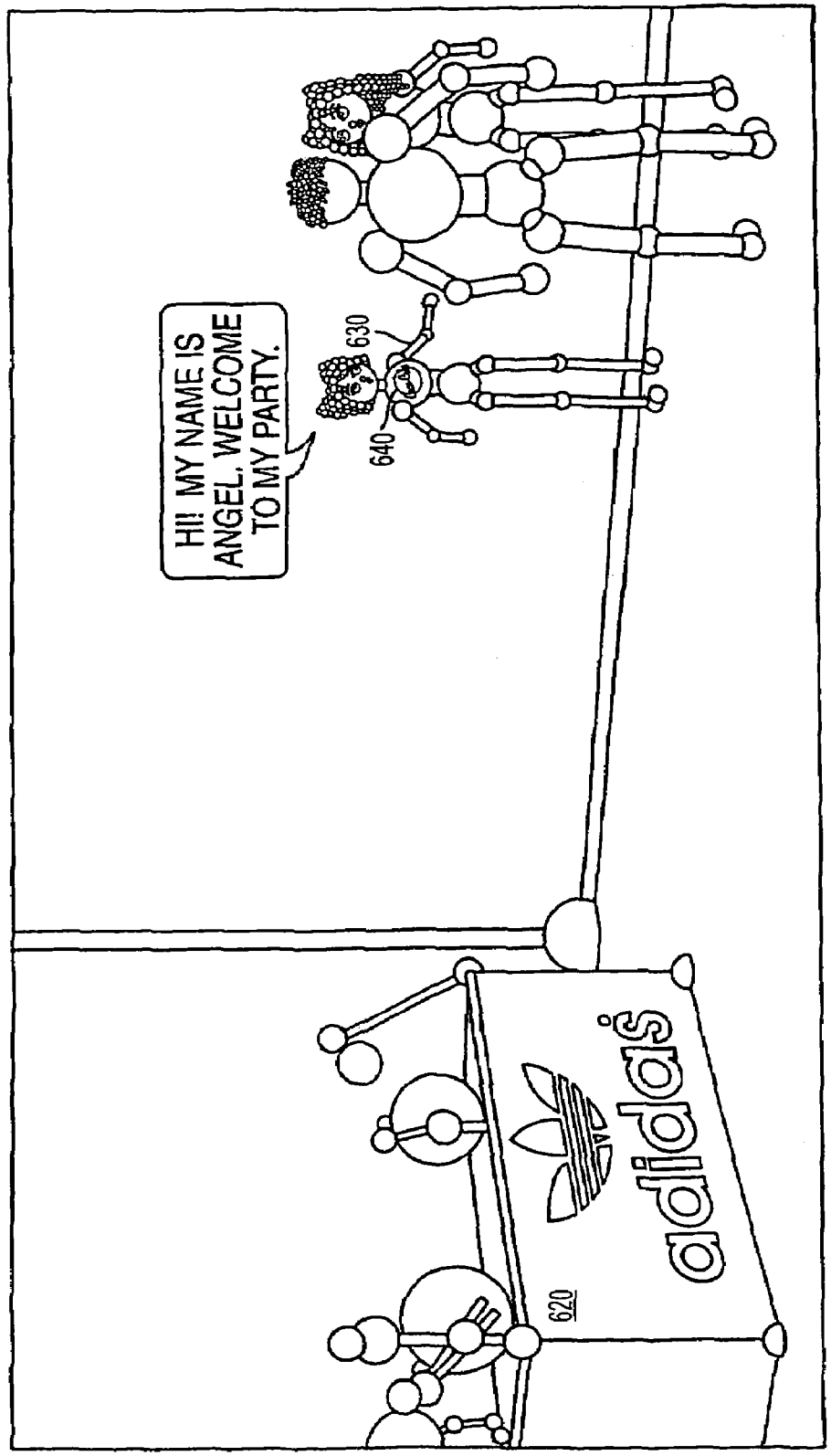
FIG. 6 shows a scene from a virtual activity in accordance with one embodiment of the invention, in which a participant has selected to put a Nike® logo on the participant's avatar and a Coca-Cola® poster on the participant's wall in a virtual space.

In addition, as described herein, the placement of an advertisement is not limited to the virtual person of a human-like avatar. For example, a poster may advertise a product in a virtual space that is controlled or shared by an avatar, such as the avatar's virtual room, studio, or virtual wall space. In alternative embodiments, a user may operate a virtual store with multiple advertisements being presented within space that is controlled by him/her. For example, in one or more embodiments of the invention, space and room are examples of locations in the virtual world, however, the locations are not limited to just these examples, as one of ordinary skill would appreciate based at least on the teachings provided herein, other locations may be constructed, selected, and/or provided. For example, FIG. 6 shows a screen from an embodiment of the invention in which an avatar 630 is engaged in animated activity within the virtual world. The consumer has named the avatar 630 as Cindy, and s/he has selected to place the name "CINDY" on her body 640. The consumer has also selected to place a Nike logo on her body 610, and a Coca-Cola poster on the wall 620. If the advertisement(s) are purely graphical in nature, they are texture-mapped onto the 2D image or 3D form in virtual spaces. If they contain audio or animation or other multimedia elements, these elements are played at times designated by the user or determined by the system.

Alternatively, the advertisement could be presented on a display controlled or shared by a user and viewable by the user or by others in the real world. The presentation could occur at user-selected places and times, or the determination of place and time for presentation could be performed by the server(s) 102, 104 based in part on sensors known in the art that provide information indicating the user's actions or location (for example, sensing real-world location from Global Positioning signals).

Another aspect of the invention is that users may be given incentives for choosing to include advertisements on their avatars. In exchange for choosing a particular advertisement, the consumer may be awarded units of money, credits or coupons that can be applied towards buying whole or fractional goods and services (in the real or virtual world), clues for winning games and contests, other information or opportunities with perceived value, or any other scarce or present resource. In one embodiment, the invention provides a mechanism for money or credits to be deducted directly from the sponsor's account, though this is optional.

Rewards may accrue to a user simply for the act of choosing an advertisement. At a minimum, the user him/herself is exposed to the ad as a result, and the potential created for later exposure to other users. The size of the reward may depend on criteria such as exposure (measured or anticipated) of the advertisement to the audience, as measured in number of users in the environment, the number of users viewing the environment, the number of minutes the advertisement is presented in the environment, or some combination of these. According to additional embodiments of the invention, rewards may be based on attributes of the presented ad such as its size, orientation, or the presence of animation or sound.

Rewards might also take into account the user's status in the virtual world, such as the amount of land or other relevant resources accumulated in a multi-player game of conquest, or elements in the consumer's profile in the consumer database 150. An advertiser may also reward consumers for submitting for the advertiser's consideration designs for inclusion in the list of advertisements available for selection and presentation by other consumers in the virtual world. Further, user rewards could be based in whole or in part on a proportion of the compensation paid to the host by the advertiser whose advertisement has been selected, or on any other criterion deemed suitable by the advertiser or the host proprietor.

Moreover, host and advertiser could structure the rewards with a view toward increasing traffic to and average time spent in the particular virtual world. For example, the size of the reward could increase with the amount of time spent presenting the advertisement, and thus with the amount of time spent in the virtual world. In another embodiment of the invention, the size of the award could increase when the consumer shares aspects of the visual world (such as scenes or links) with others, when a viewer of the advertisement connects with other networked information related to the advertisement (such as "clicking through" from the advertisement in a virtual world to an informational web page elsewhere in the networked environment), or when the user transfers a scene containing the advertisement to another medium (such as an email or a printed image). The consumer presumably will take into account the reward structure in making decisions regarding his/her participation in the virtual world. The decisions of interest to the host are recorded in the presentation tracking database 154.

Depending on the nature of the reward, distribution of the rewards to users will be handled in the virtual or in the real world. Increasing the credit an avatar may draw on in a virtual casino would likely be done entirely in the virtual world, while awarding product samples would require mailing those samples in the real world, just as awarding frequent flier miles would require updating the consumer's account stored in a computer that is not necessarily part of the virtual world. The host may establish appropriate ancillary systems of well-known types to handle such tasks.

Figure 4B:
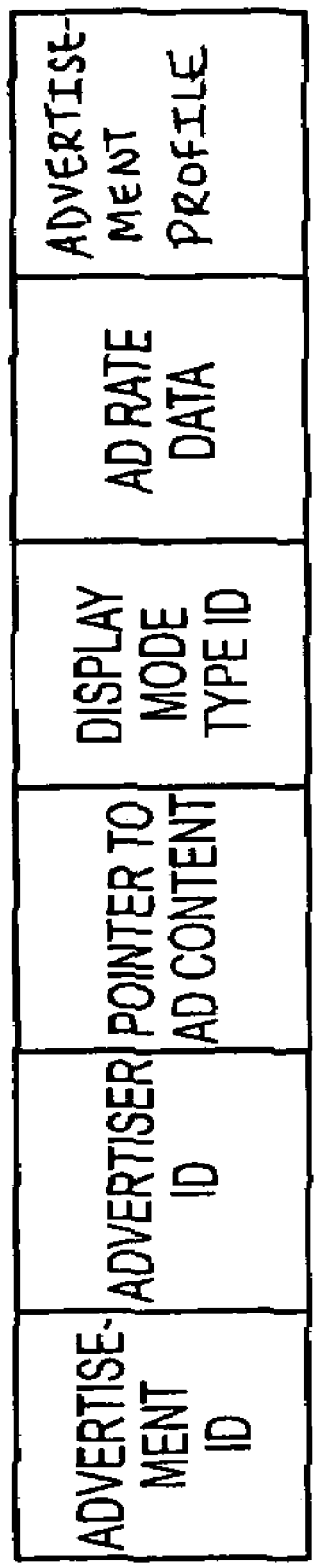

Server(s) 102, 104 maintain several databases, including customer database 150 and presentation tracking database 154 mentioned above, as well as advertising database 152. FIGS. 4A, 4B and 4C show the database fields for users, advertisers and transactions, respectively, as used in embodiments of the invention. As one of ordinary skill in the relevant arts would appreciate based at least on the teachings provided herein, the database fields are constructed to facilitate the exchange and tracking of information in accordance with the embodiments of the invention.

The server(s) 102, 104 will track and record in the appropriate database, 152, information relevant to billing an advertiser, such as the total time 433 that advertisement 431 is presented in the environment 432, the number of other users that are visually exposed to the advertisement 434, the number of non-participant viewers who are visually exposed to the advertisement 436, or the total times of these exposures 438. This information will be stored in presentation tracking database 154 by the server. Off line programs (shown in FIG. 1 as billing system 170) will use this information to generate information for billing the advertisers. Alternatively, the client software can track this information, and transmit it periodically to the server. In another alternative embodiment, some or all of the information may be stored in a smart card or other off-line storage medium, as described elsewhere herein. In addition, such off-line storage devices may be updated periodically and do not require a persistent connection.

Consumer database 150 includes profiles of consumers (401) who have participated or have expressed an intention to participate in the particular virtual world. It includes user registration information (402-405). The consumer database may include information (406) necessary to allow a consumer to pick up where s/he previously left the virtual world by storing information about her/his avatar and its recent activities. The database may also be used to assemble information about the consumer from any kind of virtual or real world source to allow the advertisers to better target their advertisements and reward offers 407. Consistent with privacy obligations and commitments, the host may want to keep track of various data relating to a consumer's participation in the virtual world, such as the actions of the user's avatar, the user's purchases, the amount of time the consumer spends in the virtual world, the scores or other quantifications of accomplishment achieved by the avatar in a game, as well as the consumer's choices with respect to the advertisements offered to him/her for present in the virtual world 408. The host may also want to use these data to update the consumer's profile in the consumer database 150.

The advertisement database 152 includes an ID (421) for each advertisement available for selection by the consumer. The advertisement may include text, symbols such as corporate logos, graphic elements such as pictures of a product, video or animation sequences, audio elements, or any other multimedia elements designed to enhance a particular brand, to create consumer awareness of a particular product or the consumer's need for it, to promote sales of a particular product, or to promote awareness of a particular source of consumer goods. If the advertisement is being served externally, an appropriate address or pointer is placed in the database. The advertisement may be as simple as branding or as complex as a video/audio sequence in the style of a television commercial. The advertisement database also includes information on how the advertisement will be presented once a consumer selects it.

To derive revenue from the advertisements, the host of the networked virtual environment can do one or more of the following:

Charge the advertiser based upon exposure (measured or anticipated) of the advertisement to the audience, as measured in number of consumers in the environment, the number of non-participants viewing the environment, the number of minutes the avatar presents the advertisement in the environment, or some combination of these.

Charge the advertiser a fixed or time-variable fee for its advertisements to be included in the set of advertisements that the consumer can choose from.

Charge the consumer a fee which is passed in part onto the sponsor as a licensing fee or royalty.

Factors determining the fee to the advertiser may also include the make-up of the pool of participants in the virtual world, the hours of the day during which the advertisement is displayed, the complexity of the advertisement, the number of times a particular advertisement was selected in a given period of time, the total time that the advertisement is displayed, and the actual or anticipated number of participant and/or users exposed to the advertisement.

The actual billing of the advertiser may be handled using a billing support system 170 that uses information obtained from databases 150, 152 and 154 to calculate the fee owed by the various advertisers in accordance with the applicable factors as discussed above.

There are a number of other benefits that may result from consumer-chosen advertising in accordance with the present invention. When selecting a particular advertisement, the consumer not only confirms his/her own interest in a particular product or his/her allegiance to a particular brand, but also (i) becomes an advertising subject, and (ii) becomes a vehicle for delivering advertising to the other consumers participating in or viewing the world. In an embodiment of the invention, for these other consumers, the advertisement presented by this avatar contains information about the interests and beliefs of the consumer who is represented by this avatar, or the role this consumer wants his/her avatar to play. Thus, noticing the advertisements presented by the various participants could further the consumers' intentions in participating in the virtual world in the first place. For example, the particular advertisement presented by a participant could become a conversation opener in a chat-room, or a basis for choosing allies in a multi-player game.

In an alternative embodiment of the invention, one of ordinary skill in the art will be able to use the advertising method depicted in FIG. 1 and described herein for presenting virtual advertisements in the 'real world.' The user performs the selection and placement process by using the client computer programs (122, etc. in FIG. 1), which need not have continuous connectivity to the computer network (110). When the user indicates s/he is satisfied with the selection, the relevant information is transmitted to the server(s) 102, 104 and may be optionally stored in consumer database 150 or presentation tracking database 154, or other devices as described elsewhere herein. At selected times or places, the relevant advertisements are dynamically included in the presentation on the display(s) 132, 134, 136. Other users who are nearby in the real world are thus exposed to this advertisement. The user also sees ads placed by other users on or in connection with their displays. Server(s) 102, 104 cause the exposure of advertisements in this manner to be logged in databases 150, 154.

In another alternative embodiment of the invention, one of ordinary skill in the art will be able to use the advertising method depicted in FIG. 1 and described herein to store the consumer database 150 and/or presentation tracking database 154 on an off-line storage medium such as a "smart card," or on storage media not directly connected to server(s) 102, 104.

Other applications of the present invention could include the following:

"Advertisements" promoting anything at all can be constructed by user-participants for other user-participants to use. All the compensation schemes discussed above can be applied, with virtual-world money or possibly real-world money.

User-participants can organize sponsored events (perhaps only open to avatars sporting the appropriate advertisement) in the virtual world and receive compensation for this.

User-participants can construct novel advertisements (on behalf of real-world advertisers) that are appropriate to the networked virtual world. These can be submitted electronically to the advertiser for approval. If approved, they would become available for consumers to place on their avatars. Optionally, the constructor of the approved advertisement could receive compensation from the advertiser based on any of the above compensation schemes.

User-participants can select advertisement(s) to be presented on a web page (for example, a "banner ad") served by a server for him/herself or other real-world people to see, with compensation determined as above.

Users can select advertisement(s) to be placed on a real-world object that is custom-built using techniques known in the art for custom manufacturing, for example, an article of clothing, a towel, a vehicle license plate, or a vehicle license plate holder.

The avatar can operate in the real world rather than a virtual world, for example as a robot or other means of 'telepresence.'

The display may be wearable and connected via wireless connection to the client computer, and the wearer of the display may select advertisement(s) to be presented for other real-world people to see, with compensation determined as above.

The display may be transported by the consumer (for example, on an automobile or shopping cart) and connected via wireless connection to the client computer, and the transporter of the display may select advertisement(s) to be displayed for him/herself other real-world people to see, with compensation determined as above.

The advertisements can be audio or video, and inserted into streaming media (such as a telephone conversation, an audio stream from a radio broadcaster or voice portal, an on-hold message, or a video stream transmitted to or recorded by the user) at points in time or upon events selected by the user, for presentation to him/herself or other real-world people.

Avatars can be configured, and advertisements can be selected and/or constructed not by the users themselves but by software agents or "bots" that are instructed or programmed by the users.

The display and computer may both be wearable, with the computer connected via wireless connection to the network, and the wearer of the display may select an advertisement to be displayed for other real-world people to see, with compensation determined as above.

User-participants can select a group or category of advertisement (such as ads about a specific product type, a specific product, products relevant to a specific activity or interest, or advertisements of a specific advertiser), after which the system or host can select the specific ad from the selected group or category.

User-participants can participate in a group selection process to determine the advertisement(s) to be presented, e.g., in a voting process.

User-participants can create a user profile indicating the groups or categories of advertisements they wish to present. Then the system or host can select the specific ad from the selected group or category based on information stored in the user-created profile.

User-participants can select modified or enhanced behaviors to be presented in conjunction with the selected advertisement.

Figure 7:
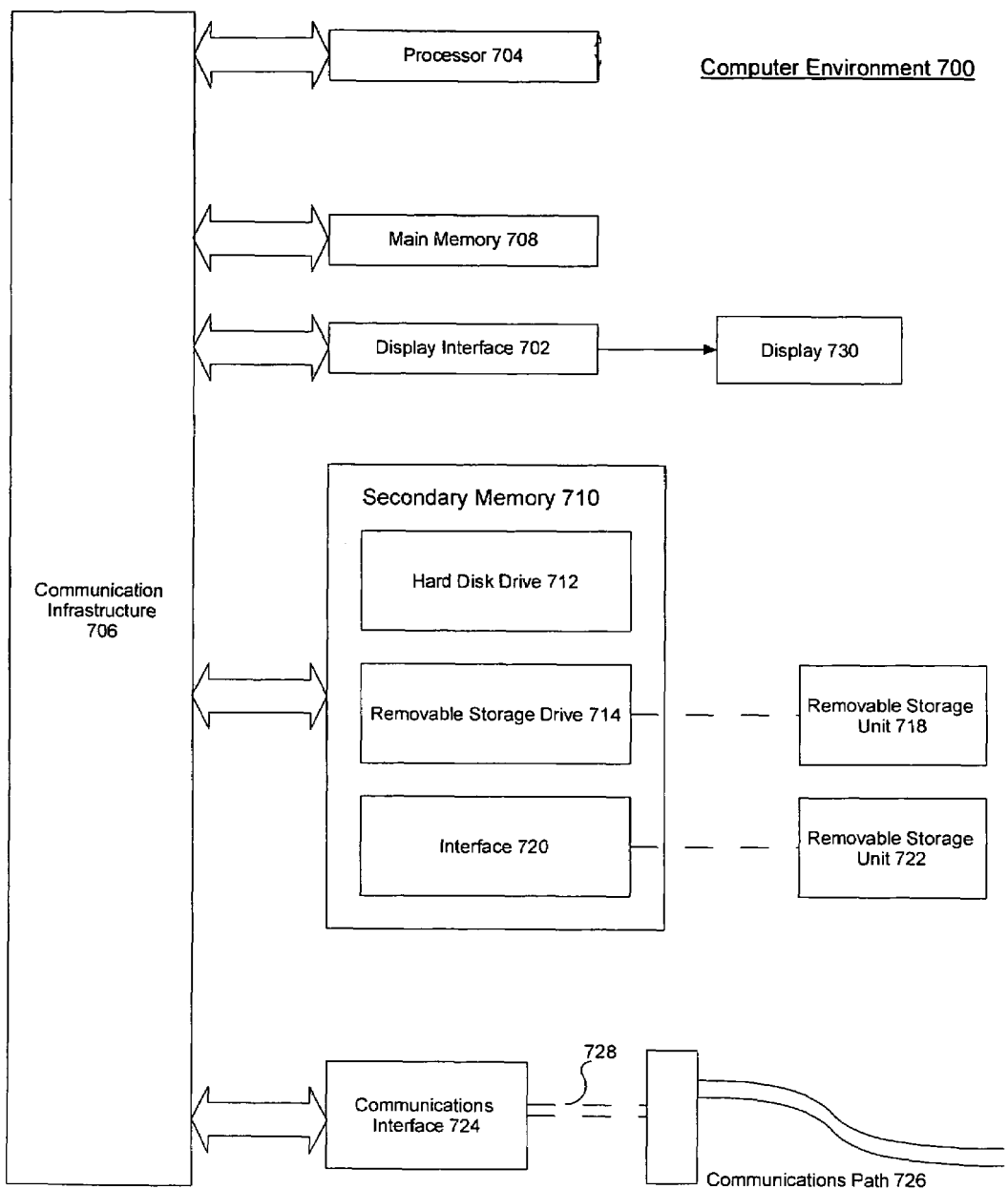
FIG. 7 illustrates a diagram of a computing environment capable of being adapted to perform the operations of the advertising system, according to an embodiment of the invention.

The present invention (i.e., the operations or components of the invention, including those illustrated in the figures or any part thereof) may be implemented using hardware, software or a combination thereof and may be implemented in one or more computer systems or other processing systems. In fact, in one embodiment, the invention may comprise one or more computer systems capable of carrying out the functionality described herein. An example of a computer system 700 is shown in FIG. 7. The computer system 700 may include one or more processors, such as processor 704. The processor 704 may be connected to a communication infrastructure 706 (e.g., a communications bus, cross over bar, or network). Various software embodiments are described in terms of this exemplary computer system. After reading this description, it will become apparent to a person skilled in the relevant art(s) how to implement the invention using other computer systems and/or computer architectures.

Computer system 700 may include a display interface 702 that may forward graphics, text, and other data from the communication infrastructure 706 (or from a frame buffer not shown) for display on the display unit 730.

Computer system 700 may also include a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc., but which is not limited thereto. The removable storage drive 714 may read from and/or write to a removable storage unit 718 in a well-known manner. Removable storage unit 718, may represent a floppy disk, magnetic tape, optical disk, etc. which may be read by and written to by removable storage drive 714. As will be appreciated, the removable storage unit 718 may include a computer usable storage medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include, but are not limited to, a program cartridge and cartridge interface (such as that found in video game devices), a removable memory chip (such as an EPROM, or PROM) and associated socket, and/or other removable storage units 722 and interfaces 720 that may allow software and data to be transferred from the removable storage unit 722 to computer system 700.

Computer system 700 may also include a communications interface 724. Communications interface 724 may allow software and data to be transferred between computer system 700 and external devices. Examples of communications interface 724 may include, but are not limited to, a modem, a network interface (such as an Ethernet card), a communications port, a PCMCIA slot and card, etc. Software and data transferred via communications interface 724 are in the form of signals 728, which may be, for example, electronic, electromagnetic, optical or other signals capable of being received by communications interface 724. These signals 728 may be provided to communications interface 724 via a communications path (i.e., channel) 726. This channel 726 may carry signals 728 and may be implemented using wire or cable, fiber optics, a phone line, a cellular phone link, an RF link and/or other communications channels.

In this document, the terms machine or computer readable storage medium and machine or computer usable medium are used to generally refer to media such as, but not limited to, removable storage drive 714, a hard disk installed in hard disk drive 712, and signals 728. These computer program media are means for providing software to computer system 700.

Computer programs (also called, among other things, computer control logic) may be stored in main memory 708 and/or secondary memory 710. Computer programs may also be received via communications interface 724. Such computer programs, when executed, enable the computer system 700 to perform the features of the present invention as discussed herein. In particular, the computer programs, when executed, may enable the processor 704 to perform the present invention in accordance with the above-described embodiments. Accordingly, such computer programs represent controllers of the computer system 700.

In an embodiment where the invention is implemented using software, the software may be stored in a computer program product and loaded into computer system 700 using, for example, removable storage drive 714, hard drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). As discussed above, the invention is implemented using any combination of hardware, firmware and software.

CONCLUSION

While various embodiments of the invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus the invention should not be limited by any of the above-described exemplary embodiments, but should be defined only in accordance with the following claims and their equivalents.

What is claimed is:

1. A machine readable storage medium storing instructions that, when executed by a machine, cause the machine to perform selected advertising within an interactive medium, the instructions comprising:

providing an advertisement group to a first user, wherein the advertisement group comprises at least one advertisement;

receiving a selection of at least one advertisement from the advertisement group from the first user;

when a plurality of locations exists, providing the plurality of locations to the first user to choose to present the at least one advertisement within the interactive medium and receiving a selection of at least one location from the plurality of locations from the first user;

when only one location exists, selecting the one location;

creating a selected advertisement from the selection of the at least one advertisement and the selection of at least one location;

storing the selected advertisement;

presenting the selected advertisement to at least one user within the interactive medium, wherein the at least one user has access to the interactive medium; and providing a reward to at least the first user, wherein the reward is based on at least the presenting the selected advertisement.

2. The instructions of claim 1, wherein the advertisement and the at least one location are selected using at least one of the interactive medium and an ancillary support environment, wherein the ancillary support environment includes at least one interface for exchanging information and choices.

3. The instructions of claim 1, wherein providing a reward comprises:
   tracking at least one interaction with the selected advertisement by the at least one user;
   and providing a reward to at least the first user, wherein the reward is based on at least the at least one interaction.

4. The instructions of claim 1, wherein the reward comprises at least one of coupons, merchandise, credits, goods, services, information about a virtual world, information about real world events, opportunities in a virtual world, virtual money, money, discounted products, discounted services, access to restricted content, contest clues, licensing fees, royalty fees, a benefit in a game, and increased social status.

5. The instructions of claim 1, further comprising:
   creating a consumer profile for the first user, wherein the consumer profile comprises at least one of
   registration information,
   environment continuation information to allow the first user to continue where the first user previously stopped in the interactive medium,
   information on at least one selected advertisement of the first user,
   information on the selection of the advertisement,
   information on the selection of at least one location, and
   reward information.

6. The instructions of claim 1, wherein the interactive medium comprises media presented via at least one of mobile devices, streaming video, streaming audio, radio, television, voice portal, web site, web meeting, internet resources, internet enabled devices, gaming systems, and information presentation environment.

7. The instructions of claim 1, wherein storing the selected advertisement comprises writing data to at least one of a nonvolatile memory accessible by a computer, an off-line storage medium, and a portable device.

8. The instructions of claim 2, wherein the ancillary support environment comprises at least one of electronic mail, web browser, online agent, instant messaging, paging, text messaging, internet resources, video messaging, and short message service.

9. The instructions of claim 1, wherein the plurality of locations comprises at least one of a wearable display, a game piece, a game card, a game element, a display controlled or influenced by the first user, a portion of a web page, a portion of a web page for a period of time, a time slot in an audio or video stream, a portion of screen real estate in a video stream, a radio or television broadcast, an on-hold audio message, real world clothing, an electronic billboard, a billboard with a processor-controlled display, a vending machine, programmable paper, a virtual character, a virtual representation of a user, a virtual place, media present in a real-world space, and media projected onto a real-world space.

10. The instructions of claim 3, wherein the at least one interaction comprises at least one of sharing at least one aspect of the interactive medium using the advertisement, tracking click events and click-through events, and transferring aspects of the interactive medium to another medium.

11. The instructions of claim 1, wherein the reward is also provided to at least one of an advertiser and a sponsor.

12. The instructions of claim 1, further comprising:
   charging a fee to the first user based on the selected advertisement group.

13. The instructions of claim 1, wherein the presenting occurs at places and times selected by a user or determined by at least sensors that provide information indicating a user's actions or a user's location.

14. The instructions of claim 1, wherein the interactive medium comprises media displayed on at least one of interactive television, an electronic bumper sticker, an article of clothing with a flexible screen, a billboard with a processor-controlled display, a mobile telephone, a personal digital assistant, a tablet computer, a mobile station, a gaming system, an augmented reality display, a telepresence system, or a videoconference display.

15. The instructions of claim 1, wherein the interactive medium comprises at least one of a collaborative virtual environment, a multi-user virtual environment, a massively multiplayer online game, a virtual world, an interactive themed environment, or an augmented reality system.

16. The instructions of claim 1, wherein the advertisement group comprises at least one advertisement in at least one category.

17. The instructions of claim 16, wherein the at least one advertisement comprises at least one of an image, an audio clip, an animated image, a multimedia movie, a behavior for an object in the interactive medium, an object that confers a benefit in a game, or a multi-user event in the interactive medium.

18. The instructions of claim 16, wherein the at least one category comprises at least one of a type of product, a brand, a vendor, a company, a specific product, products relevant to a specific activity or interest, and advertisements of a specific advertiser.

19. The instructions of claim 1, wherein the advertisement group comprises an advertisement profile, the advertisement profile comprising a plurality of advertisements selected from at least one category.

20. The instructions of claim 19, wherein the advertisement profile is provided by the first user.

21. The instructions of claim 19, wherein each of the plurality of advertisements comprises at least one of an image, an audio clip, an animated image, a multimedia movie, a behavior for an object in the interactive medium, an object that confers a benefit in a game, or a multi-user event in the interactive medium.

22. The instructions of claim 1, wherein the first user is a host of the interactive medium.

23. The instructions of claim 1, wherein the first user is a party commissioned to create the advertisement group.

24. The instructions of claim 19, wherein the at least one category comprises at least one of a type of product, a brand, a vendor, a company, a specific product, products relevant to a specific activity or interest, and advertisements of a specific advertiser.

25. The instructions of claim 16, wherein the at least one advertisement comprises at least one of a logo, a name, a commercial symbol, a virtual object associated with an advertiser, an audio clip, a video clip, or a banner.

26. The instructions of claim 19, wherein each of the plurality of advertisements comprises at least one of a logo, a name, a commercial symbol, a virtual object associated with an advertiser, an audio clip, a video clip, or a banner.

27. The instructions of claim 1, wherein the at least one advertisement comprises at least one of an advertisement concept and an advertisement campaign within the interactive medium.

28. The instructions of claim 1, wherein the reward comprises intangible rewards.

29. The instructions of claim 1, wherein the first user creates at least one advertisement of the advertisement group.

30. The instructions of claim 2, wherein the interface comprises at least one of a mobile station, a wireless device, an internet enabled device, a media player, and a gaming system, and wherein the machine comprises at least one of a processor executing the instructions and a plurality of processors executing the instructions in a distributed manner.

31. A system for selected advertising within an interactive medium, comprising:

first providing means for providing an advertisement group to a first user, wherein the advertisement group comprises at least one advertisement;

first receiving means for receiving a selection of at least one advertisement from the advertisement group from the first user;

when a plurality of locations exists, second providing means for providing the plurality of locations to the first user to choose to present the at least one advertisement within the interactive medium and receiving a selection of at least one location from the plurality of locations from the first user;

when only one location exists, first selecting means to select the one location;

first creating means for creating a selected advertisement from the selection of the at least one advertisement and the selection of at least one location;

first storing means for storing the selected advertisement;

first presenting means for presenting the selected advertisement to at least one user within the interactive medium, wherein the at least one user has access to the interactive medium; and first reward means for providing a reward to at least the first user, wherein the reward is based on at least the presenting the selected advertisement.

* * * * *